United States Patent [19]
Borgstahl et al.

[11] Patent Number: 6,069,896
[45] Date of Patent: May 30, 2000

[54] CAPABILITY ADDRESSABLE NETWORK AND METHOD THEREFOR

[75] Inventors: Ronald W. Borgstahl, Phoenix; Jeffrey Martin Harris; Ernest Earl Woodward, both of Chandler; David G. Leeper, Scottsdale, all of Ariz.

[73] Assignee: Motorola, Inc., Schaumburg, Ill.

[21] Appl. No.: 08/729,207

[22] Filed: Oct. 15, 1996

[51] Int. Cl.[7] ............................................. H04J 3/00
[52] U.S. Cl. ............................ 370/401; 370/260; 370/338
[58] Field of Search ........................................ 370/260, 261, 370/262, 310, 329, 338, 341, 348, 349, 401

[56] References Cited

U.S. PATENT DOCUMENTS

| | | | |
|---|---|---|---|
| 5,572,528 | 11/1996 | Shuen | 370/338 |
| 5,680,392 | 10/1997 | Semaan | 370/261 |
| 5,758,079 | 5/1998 | Ludwig et al. | 370/261 |

*Primary Examiner*—Douglas W. Olms
*Assistant Examiner*—Shick Hom
*Attorney, Agent, or Firm*—Gregory John Gorrie; Robert D. Atkins

[57] ABSTRACT

A wireless, peer-to-peer, capability addressable network (22) is disclosed. The network (22) accommodates any number of peers (20). Network connections are formed based upon proximity between peers (20) and upon a needs and capabilities evaluation (82). Networks (22) support three classifications of service capabilities: service requesting, service providing, and service relaying. Wireless communications occur at a sufficiently low power to form a detection zone (28) of less than five meters for many peers (20).

20 Claims, 5 Drawing Sheets

APPLIANCE CIRCUITS — 48
PDA
TELEVISION
RADIO
CD PLAYER
TAPE PLAYER
COPIER
FACSIMILE
TELEPHONE
CELL PHONE
CORDLESS PHONE
PAGER
WATCH
COMPUTER
POS TERMINAL
AUTOMATED TELLER
⋮

*FIG. 3*

RELAY INTERFACE — 44
MODEM - PSTN
NETWORK - LAN
NETWORK - WAN
MODEM - SATELLITE
CELL PHONE - PSTN
TELEPHONE - PSTN
⋮

*FIG. 4*

| I/O | | 46 |
|---|---|---|
| INPUT DEVICES | OUTPUT DEVICES | |
| KEYBOARD<br>POINTING DEVICE<br>OPTICAL SCANNER<br>MICROPHONE<br>⋮ | PRINTER<br>MODEM<br>SPEAKER<br>⋮ | |

*FIG. 5*

| NEED/CAPABILITY MESSAGE | | | | | 64 |
|---|---|---|---|---|---|
| PEER ID | AUTHORIZATION KEY | NEED(S) SPECIFICATION | CAPABILITIES SPECIFICATION | ... | |
| 66 | 68 | 70 | 72 | | |

*FIG. 7*

| NEED TABLE | | — 74 |
|---|---|---|
| CODE | MEANING | |
| — | APPLIANCE PERSONALIZATION (E.G., OWNERS NAME) | |
| — | HARD COPY (E.G., PRINT) | |
| — | VISUAL IMAGE (E.G., DISPLAY) | |
| — | AUDIO (E.G., HIGH FIDELITY) | |
| — | GATEWAY (E.G., INTERNET) | |
| — | FINANCIAL TRANSACTIONS (E.G., POS, POINT OF SALE) | |
| — | LOCK/UNLOCK (E.G., SECURITY ENABLE/DISABLE) | |
| ⋮ | ⋮ | |

*FIG. 8*

| CAPABILITY TABLE | | — 76 |
|---|---|---|
| CODE | MEANING | |
| — | APPLIANCE PERSONALIZATION (E.G., OWNERS NAME) | |
| — | HARD COPY (E.G., PRINT) | |
| — | MULTIMEDIA (E.G., REAL TIME VIDEO) | |
| — | VOICE (E.G., SPEECH) | |
| — | AUDIO (E.G., HIGH FIDELITY) | |
| — | GATEWAY (E.G., INTERNET) | |
| — | FINANCIAL TRANSACTIONS (E.G., POS, POINT OF SALE) | |
| — | LOCK/UNLOCK (E.G., SECURITY ENABLE/DISABLE) | |
| ⋮ | ⋮ | |

CAPABILITY ADDRESSABLE NETWORK AND METHOD THEREFOR

TECHNICAL FIELD OF THE INVENTION

The present invention relates generally to data communication networks. More specifically, the present invention relates to a peer-to-peer network in which node addressing is dynamically configurable.

BACKGROUND OF THE INVENTION

In a typical day many people come into contact with a massive number of electronically controlled devices. Such devices range from automobiles and appliances, to home and office equipment, and to telephones and televisions to name but a few. Many of these devices are required to move from time to time, and many of these devices are even portable. These devices provide a vast and diverse assortment of services for the people coming into contact with them. However, they suffer from a common problem related to user input and output (I/O).

User I/O refers to components and processes used to communicate user-supplied data to an electronic device and to annunciate data from an electronic device so the data may be perceived by a user. Although electronic devices provide a vast and diverse assortment of services, they tend to have redundant I/O. In other words, many such devices have displays, speakers, and the like at which data may be annunciated and have buttons, switches, keypads, and other controls at which user-supplied data may be communicated to the devices. In order to keep costs low and size small, user I/O capabilities often suffer. As a result, many electronic devices encountered in everyday life, and particularly many portable devices, are cumbersome and tedious to use because communicating data from a user to the devices is difficult and because provisions are unavailable for clearly annunciating data for a user's benefit.

In theory, this user I/O problem could be ameliorated by better integrating electronic devices to ease data communications therebetween. For example, a portable telephone could receive a facsimile (fax), but typically has no capability to print the fax and typically has no capability to communicate with a printer which may be able to print the fax. Likewise, a pager may receive a call-back phone number, but typical pagers have no capability to transfer the call-back number to a telephone from which the call-back can be made. User involvement is required to address these and many other data transfer issues. While many conventional data communication or computer network architectures are known, the conventional architectures are unsuitable for the task of integrating a plurality of electronic devices which collectively provide a vast and diverse assortment of services.

Conventional computer networks require excessively complicated setup or activation procedures. Such setup and activation procedures make the jobs of forming a connection to a new network node and making changes in connectibility permission cumbersome at best. Setup and activation procedures are instituted, at least in part, to maintain control of security and to define network addresses. Typically, a system administration level of security clearance is required before access is granted to network tables that define the network addresses. Thus, in conventional networks, many network users lack sufficient security clearance to activate and obtain addresses of network nodes with which they may wish to connect on their own.

Once setup is performed, either directly by a user or by a system administrator, connections are formed when an initiating node presents the network with the address of a network node to which a connection is desired. The setup or activation requirements of conventional networks force nodes to know or obtain a priori knowledge of node addresses with which they wish to connect prior to making the connection. Excessive user attention is involved in making the connection through setup procedures and during the instant of connection to obtain addresses. This level of user involvement leads to an impractical network implementation between the everyday electronic devices with which people come into contact.

Further, conventional computer networks tend to be infrastructure intensive. The infrastructure includes wiring, servers, base stations, hubs, and other devices which are dedicated to network use but have no substantial non-network use to the computers they interconnect. The use of extensive network components is undesirable for a network implementation between everyday electronic devices because an immense expense would be involved to support such an infrastructure and because it impedes portability and movability of nodes.

The use of wiring to interconnect network nodes is a particularly offensive impediment to the use of conventional networks because wiring between diverse nodes is not suitable when some of the nodes are portable. Wireless communication links could theoretically solve the wiring problem. And, conventional wireless data communication networks are known. However, the conventional wireless networks do little more than replace wire lines with wireless communication links. An excessive amount of infrastructure and excessive user involvement in setup procedures are still required.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a list of appliance circuits which may be included in the hardware illustrated in FIG. 2;

FIG. 4 shows a list of gateways which may be included in the hardware illustrated in FIG. 2;

FIG. 5 shows a list of I/O devices which may be included in the hardware illustrated in FIG. 2;

FIG. 7 shows a data format diagram of an exemplary need/capability message communicated from a peer to initiate a setup connection;

FIG. 8 shows an exemplary need table which identifies possible network service needs which might occur at a peer;

FIG. 9 shows an exemplary capability table which identifies possible network capabilities which may be provided by a peer.

DETAILED DESCRIPTION OF THE DRAWINGS

Figure 1:
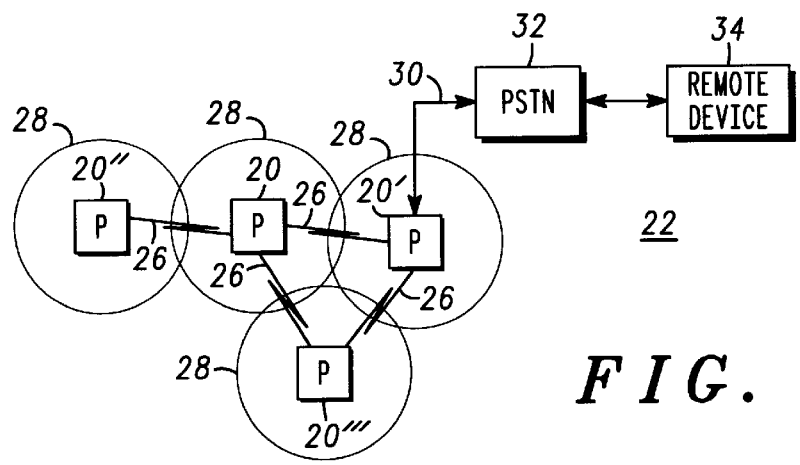
FIG. 1 shows a layout diagram depicting exemplary relationships between various peers in a wireless peer-to-peer data communication network configured in accordance with the teaching of the present invention.

FIG. 1 shows a layout diagram depicting relationships between various peers (P) 20 in a capability addressable, wireless, peer-to-peer data communication network 22 configured in accordance with the teaching of the present invention. While FIG. 1 shows only a few peers 20, virtually any computer or microprocessor controlled electronic device throughout the world may serve as a peer 20. Accordingly, network 22 supports an unlimited number of possible connections between peers 20.

As used herein, the term "peer-to-peer" is defined to mean having at least common portions of communications protocol and/or capability and does not refer to equivalence of physical size, functional capability, data processing capacity or transmitter/receiver range or power. Each peer or communication node 20 of communications network 22 may establish a personal area network. For example, a first and a second of nodes 20 first find or determine that each other is a compatible node. Then, as a result of self-initiated processes, first and second nodes 20 form the personal network. First and second nodes 20 must detect that they are in a particular proximity to one another and if so a communication link is established. This link may be accomplished by known RF, IR, optical or acoustic techniques, or by conduction through a living body. When a link is established, first and second nodes 20 exchange what their needs and capabilities are. When needs and capabilities are not able to be satisfied or matched, one of first and second nodes 20 may alternately route the communications link to a third communication node 20. Put another way, a communications platform that includes at least two nodes having overlapping communications regions could also include means for exchanging needs and capabilities information between the at least two nodes for forming a communication network.

Network 22 is desirably configured in a peer-to-peer architecture so that only a minimal number of network-specific components are used and no fixed infrastructure is required. In the preferred embodiments, each peer 20 can initiate a connection with other peers 20 without servers being required to manage the connections. Moreover, peers 20 can freely move about without affecting the network structure or requiring the performance of reconfiguration, setup, or activation procedures.

Free movement of peers 20 is further supported by using wireless communication links 26 as a physical transport layer in network 22. In the preferred embodiments, wireless communication links 26 are RF links operating in the higher regions of the microwave band so that small, lightweight, inexpensive, omni-directional antennas may be used. However, other RF frequencies, optical links, and other wireless communication links known to those skilled in the art may be used as well. The specific protocols used in implementing wireless communication links 26 are not important to the present invention. Various TDMA, FDMA, and/or CDMA techniques known to those skilled in the art may be employed. However, all peers 20 in network 22 desirably have the ability to communicate using the protocols, regardless of the capabilities and needs of the peers 20.

FIG. 1 depicts a detection zone 28 surrounding each peer 20. In the preferred embodiments, wireless communication links 26 for the vast majority of peers 20 are operated at a sufficiently low power so that a wireless communication range for a given peer 20 is preferably less than 5 meters, although the range may be much greater, for the typical peer 20. The use of this degree of low power transmissions limits interference between independent connections which may share the wireless spectrum at different locations. Moreover, the use of this degree of low power transmissions is compatible with configuring a substantial portion of peers 20 as portable devices. Those skilled in the art will appreciate that hand portable electronic devices share the characteristics of being physically small, lightweight, and including a self-contained power source such as a battery. Extremely low power transmissions do not severely deplete the reserves of small batteries typically used in portable devices.

While a peer 20 may potentially connect through network 22 with a vast multitude of peers 20, the use of low power wireless communication links 26 limits the number of potential connections at any given instant in time to those peers 20 which are physically proximate to one another. In other words, only when a first peer 20 resides in the detection zone 28 of a second peer 20 and that second peer 20 resides in the detection zone 28 of the first peer 20 can a connection through network 22 occur.

Rather than specifying a network unique address to initiate a connection, network 22 uses physical proximity along with a needs and capabilities evaluation (discussed below) to target a peer 20 with which a connection is desired. By not specifying a network unique address to initiate a connection, user involvement in making connections is reduced and network addressing becomes dynamically configurable. Such an addressing scheme is useful in exchanging data between devices a user carries and comes into contact with on a daily basis. Relaying information between peers not in direct communication is also possible. For example, peer 20" may establish a communication link with peer 20''' via peer 20. In this case, peer 20 provides the relay interface between the other two peers.

Not all peers 20 are required to be portable devices. FIG. 1 shows a communication link 30, which may or may not include a wireline link, connecting a peer 20' to a public switched telecommunication network (PSTN) 32. Through PSTN 32, peer 20' may communicate with a vast assortment of remote devices 34, of which FIG. 1 shows only one. Peer 20' may be powered from a public power network (not shown) so that minimizing power consumption is not a significant design issue. While FIG. 1 depicts only PSTN 32 linking a peer 20 to a remote device 34, other local area network (LAN), wide area network (WAN) or communication links known to those skilled in the art may connect a peer 20 to remote devices 34. Remote devices 34 may or may not themselves be peers 20. While network 22 uses proximity as a factor in targeting peers 20 to which connections are formed, the use of routing, gateway or relaying peers 20' permits connections to be extended over great distances through the use of other networks.

Figure 2:
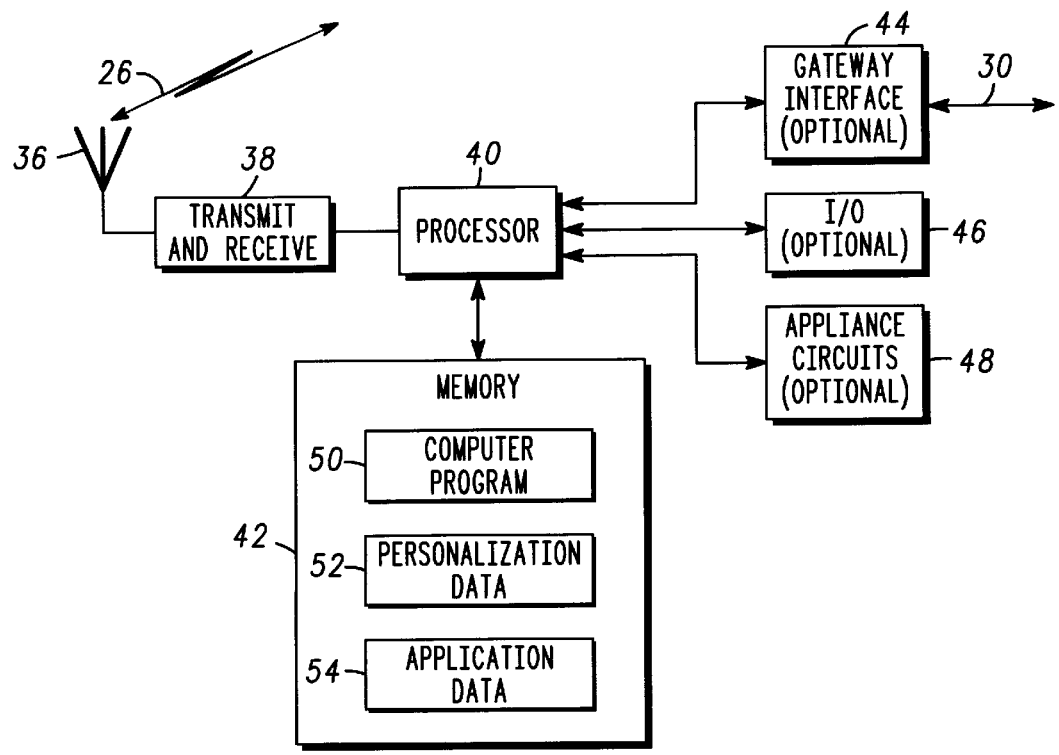
FIG. 2 shows a block diagram of hardware included in a peer.

FIG. 2 shows a block diagram of hardware included in a peer 20. Peer 20 includes an antenna 36 configured to support wireless communication link 26. Antenna 36 couples to a transmit and receive section 38. Transmit and receive section 38 is compatible with the protocols peers 20 use to communicate with one another. Transmit and receive section 38 couples to a processor 40. Processor 40 couples to a memory 42, an optional gateway 44, communication link 30, an optional I/O section 46, transmit and receive unit 38 and optional appliance circuits 48.

Processor 40 executes computer programs 50 which are stored in memory 42. Computer programs 50 define processes performed by processor 40 and peer 20. Memory 42 additionally stores personalization data 52 and application data 54. Personalization data 52 characterize a user or owner of peer 20 and may change from user to user. ID codes, passwords, and PINs are examples of personalization data as are radio or TV channel presets, language preferences, and speed dial telephone numbers. Application data 54 are provided by performing peer applications, and may change from moment to moment. A facsimile, a telephone number received over a pager, data scanned in using a bar code reader, and a sound snippet received from a microphone or other audio source represent examples of application data.

In one embodiment, the present invention is realized as an integrated circuit for interactively coupling one or more communication nodes in a common network. The integrated circuit includes, in combination, a receiver for receiving input data, a transmitter for transmitting output data and a processor. The processor is coupled to the receiver and transmitter for interactively coupling a first common node to a second common node. The processor includes apparatus for activating a communications link between the first and second common nodes when the first and second common nodes are within a predetermined distance from each other and when needs and capabilities of said first and second common nodes overlap.

FIG. 3 shows a non-exhaustive list of examples of appliance circuits 48 which may be included in a peer 20. Referring to FIGS. 2 and 3, appliance circuits 48 may be configured as any type of a wide variety of everyday, commonly encountered electronically controlled devices, fixed or portable. Thus, a peer 20 may, in addition to being a peer 20, be a personal digital assistant (PDA), television, radio, CD player, tape player, copier, facsimile machine, telephone, cellular telephone, cordless telephone, pager, watch, computer, point of sale (POS) terminal, automated teller, or other electronic device.

FIG. 4 shows a non-exhaustive list of gateways 44 which may be included in a peer 20. Referring to FIGS. 2 and 4, gateways 44 may be configured as any of a wide variety of relay, routing, or protocol conversion devices known to those skilled in the art. For example, a peer 20 may, in addition to being a peer 20, be a modem which couples peer 20 to PSTN 32 (see FIG. 1). Other gateways 44 may couple a peer 20 to LANs or WANs. Still other gateways 44 may couple a peer 20 modem to a satellite, a peer 20 cell phone to PSTN 32, a plain old telephone (POT) peer 20 to PSTN 32.

FIG. 5 shows a non-exhaustive list of I/O devices 46 which may be included in a peer 20. Referring to FIGS. 2 and 5, I/O devices 46 may be classified into input devices and output devices. Input devices may include keyboards, pointing devices, optical scanners, microphones, and other well known input devices. Output devices may include printers, monitors, speakers, and other well known output devices. Thus, in addition to being a peer 20, a peer 20 may be an I/O device 46.

Those skilled in the art will appreciate that gateways 44, I/O section 46 and appliance circuits 48 are not mutually exclusive categories. For example, many devices fall into multiple categories. For example, a computer considered as an appliance may include both an I/O section and a gateway. Likewise, a gateway may serve an I/O role.

Figure 6:
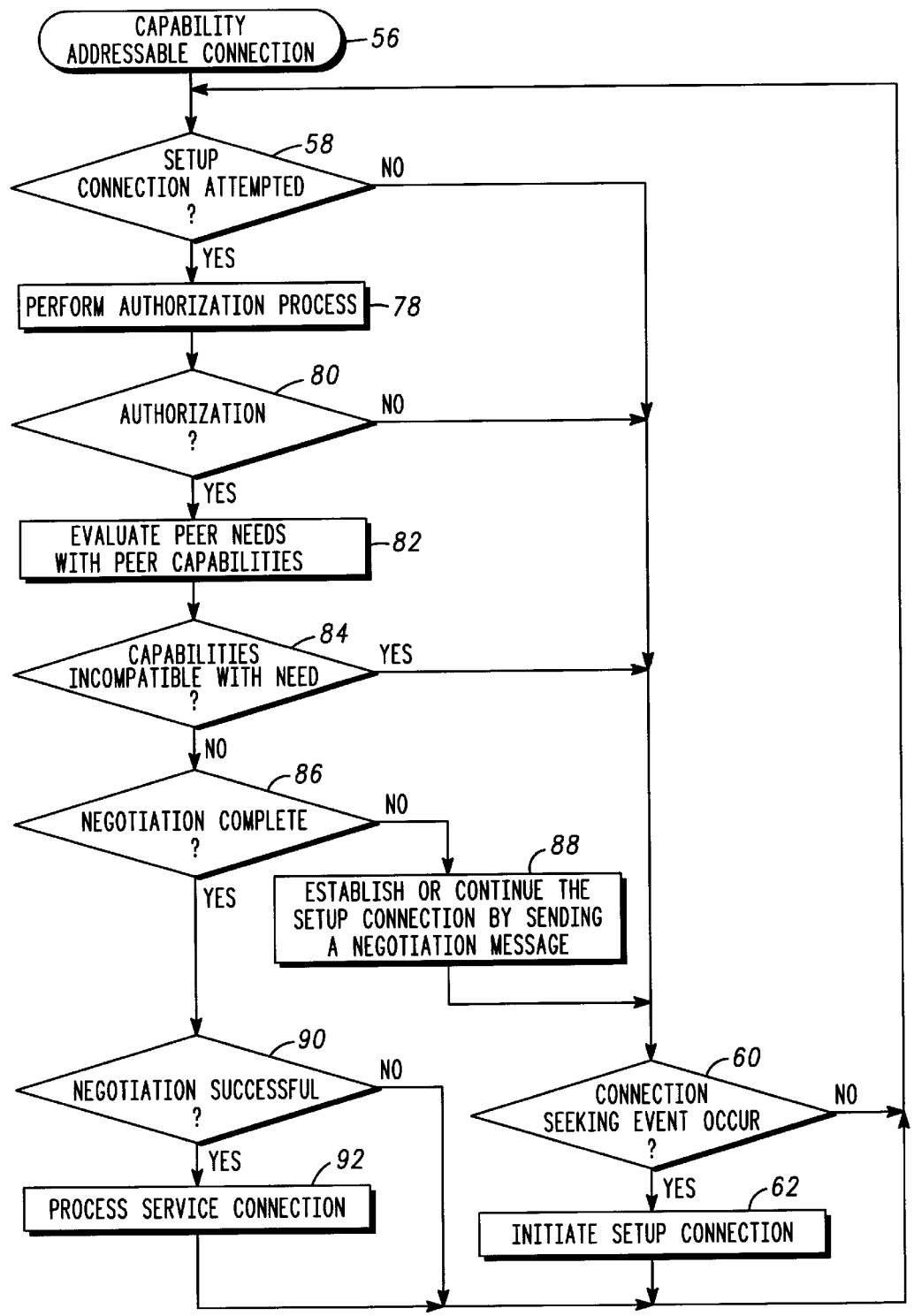
FIG. 6 shows a flow chart of exemplary tasks included in a capability addressable connection process performed by a peer.

FIG. 6 shows a flow chart of tasks included in a capability addressable connection process 56 performed by a peer 20. Process 56 is defined by a computer program 50 stored in memory 42 of peer 20 (see FIG. 2) in a manner well known to those skilled in the art. In the preferred embodiments, all peers 20 perform a process similar to process 56.

Process 56 includes a query task 58 during which peer 20 determines whether a setup connection is being attempted. Generally, task 58 allows a first peer 20 to determine whether a second peer 20 is physically proximate to the first peer 20. Task 58 causes transmit and receive section 38 (see FIG. 2) to monitor wireless communication link 26 (see FIG. 1) to determine whether a signal compatible with a protocol being used by network 22 (see FIG. 1) can be received. Due to the above-described low transmission power levels used by peers 20, when a signal is detected, the peer 20 sending the signal is located near the receiving peer 20.

When task 58 fails to determine that a setup connection is being attempted, a query task 60 determines whether a connection-seeking event has occurred. A connection-seeking event causes a peer 20 to seek out a connection with another peer 20. Connection-seeking events can be triggered using a periodic schedule. For example, connections may be sought out every few seconds. In this example, the schedule may call for more frequent periodic connection attempts from peers 20 which are powered from a public power network and less frequent connection attempts from peers 20 which are battery powered. Connection-seeking events can also be triggered upon the expiration of a fixed or random interval timer or upon the receipt of other external information. The other external information can include information obtained through appliance circuits 48, gateway 44, or I/O section 46 (see FIG. 2) including user input.

If task 60 fails to determine that a connection-seeking event has occurred, program control loops back to task 58. If task 60 determines that a connection-seeking event has occurred, process 56 performs a task 62. Task 62 initiates an unsolicited setup connection. The setup connection is not addressed to any particular peer 20 of network 22. Rather, it is broadcast from the peer 20 making the attempt and will be received by all peers 20 within the detection zone 28 (see FIG. 1) of the broadcasting peer 20. As discussed below, the broadcast signal need not be answered by another peer 20 even when another peer 20 is in detection zone 28. At this point, the broadcasting peer 20 need not know if any other peer 20 can receive the broadcast signal, and the broadcasting peer 20 may or may not know any particular needs or capabilities of other peers 20 should other peers 20 be sufficiently proximate so that a connection may be formed.

Task 62 initiates a setup connection by broadcasting a need/capability message 64, an exemplary format for which is depicted in FIG. 7. Referring to FIG. 7, message 64 includes an ID 66 for the peer 20 broadcasting message 64, an authorization key 68, a need specification 70, a capability specification 72, and can include other data elements. ID 66 is desirably sufficiently unique within the domain of network 22 so that it may be used in an addressed service connection, should the setup connection prove successful. Authorization key 68 includes one or more data codes which may be used by a receiving peer 20 in performing an authorization process. Needs specification 70 is a list of network needs currently experienced by the broadcasting peer 20. Capability specification 72 is a list of network capabilities which the broadcasting peer 20 may provide to other peers 20 of network 22.

Needs specification 70 may be determined by consulting a need table 74, an exemplary and non-exhaustive block diagram of which is depicted in FIG. 8. As illustrated in FIG. 8, data codes may be associated with a variety of network service needs which a service-requesting peer 20 may experience.

One exemplary need is that of appliance personalization. In the appliance personalization need example, a PDA might need to personalize nearby appliances. To satisfy this need, personalization data 52 (see FIG. 2) should be programmed into certain nearby appliances without user intervention. As a result, the certain appliances will always be programmed with a particular user's personalization data whenever that user is near, without requiring action on the user's part, and regardless of prior persons who may have used the appliance.

Other exemplary needs can include that of printing application data 54 (see FIG. 2), displaying application data 54, annunciating application data 54 at a speaker, routing connectivity to the Internet or other network resources, POS transactions, passage through secure areas or toll booths, and the like.

Capability specification 72 may be determined by consulting a capability table 76, an exemplary and non-exhaustive block diagram of which is depicted in FIG. 9. As illustrated in FIG. 9, data codes may be associated with a variety of network capabilities provided by a service-providing peer 20. For example, a service-providing peer 20 capability can be that of appliance personalization. Thus, a peer 20 may be capable of being personalized by personalization data 52 (see FIG. 2). Other examples include capabilities of printing, displaying, annunciating over a speaker, relaying a connection through the Internet or other network or POS terminal, and unlocking a secured passageway, to name a few. In general, potential capabilities are compatible with potential needs.

Referring back to FIG. 7, need/capability message 64 includes those codes from tables 74 and 76 (see FIGS. 8–9) that currently apply. While a peer 20 may have more than one need or capability at a given instant, nothing requires a peer 20 to have multiple needs or capabilities. Moreover, nothing requires a peer 20 to have both a network need and a network capability. Message 64 serves as a need message if a peer need is specified regardless of whether a peer capability is specified and as a capability message if a peer capability is specified regardless of whether a peer need is specified.

Referring back to FIG. 6, after task 62 broadcasts message 64 (see FIG. 7), program control loops back to task 58.

When task 58 eventually detects that a setup connection is being attempted by receiving a message 64, a task 78 performs an authorization process. Task 78 uses authorization key 68 (see FIG. 7) from message 64 to determine if the peer 20 attempting to setup a connection is authorized to connect to the receiving peer 20. Task 78 allows an owner of a peer 20 to restrict access to the owned peer 20 through network 22. The authorization process of task 78 may be used, for example, to restrict personalization capabilities of an appliance to a small family group. Alternatively, a peer 20 having a POS capability may perform an extensive authorization process before permitting a transaction to take place. A peer 20 having a need may also qualify the receipt of provided services depending upon the authorization process provided by task 78.

After task 78, a query task 80 determines whether the authorization process 78 authorized the attempted setup connection. If authorization is denied, program control loops back to task 60. The receiving peer 20 need not reply or otherwise acknowledge the attempted setup connection.

If authorization is accepted, a task 82 evaluates peer needs with peer capabilities. In other words, task 82 causes the message-receiving peer to compare its available capabilities (if any) to any needs listed in a received unsolicited need/capability message 64 (see FIG. 7) and to compare its available needs (if any) to any capabilities listed in the message 64. After task 82, a query task 84 acts upon the result of the evaluation of task 82. If no internal capabilities match needs indicated in an unsolicited message 64, and if no internal needs match capabilities indicated in an unsolicited message 64, then neither peer 20 can be of service to the other. Program control loops back to task 60, and the receiving peer 20 need not reply or otherwise acknowledge the attempted setup connection.

At this point, the vast multitude of potential connections which a peer 20 may make within network 22 has been greatly reduced in scope without the use of network-unique addressing. The low power transmission scheme excludes most peers 20 in network 22 from being connectable at a current instant because most peers 20 will not be proximate one another. Of the few peers 20 which may be within each other's detection zones 28 (see FIG. 1), the scope of potential connections has been further limited through the authorization process of task 78 and needs and capabilities evaluation of task 82. Additional exclusions on the remaining potential connections are performed through a negotiation process carried on between a service-requesting peer 20 and a service-providing peer 20.

When task 84 determines that capabilities and needs appear to be compatible, a query task 86 determines whether this negotiation process is complete. If the negotiation process is not complete, a task 88 establishes or otherwise continues the setup connection in furtherance of the negotiation process by sending an addressed negotiation message (not shown) to the peer 20 whose peer ID 66 (see FIG. 7) was included in a just-received needs/capabilities message 64. The negotiation message can have a form similar to that of needs/capabilities message 64, but be specifically addressed to the other peer 20.

After task 88, program control loops back to task 60. Subsequent negotiation messages may, but need not, be received. If such subsequent negotiation messages indicate that both peers 20 to the prospective connection have completed negotiation, a query task 90 determines whether the negotiation was successful. If the negotiation was not successful, program control loops back to task 58, and no service connection will result. However, if the negotiation was successful, a process service connection procedure 92 is performed. During procedure 92, a one-to-one, addressed connection is established between peers 20 to perform network services. Upon completion of the service connection, program flow loops back to task 58.

While nothing prevents capability addressable connection process 56 from relying upon user intervention during the setup connection process, user intervention is not required. Whether user intervention is required or not should depend upon the security, a priori knowledge and other considerations connected with the nature of the peers 20 involved. For example, peers 20 involved in financial transactions can benefit upon user intervention to ensure security. However, personalization of user-owned appliances and many other connection scenarios need not rely on user intervention.

Figure 10:
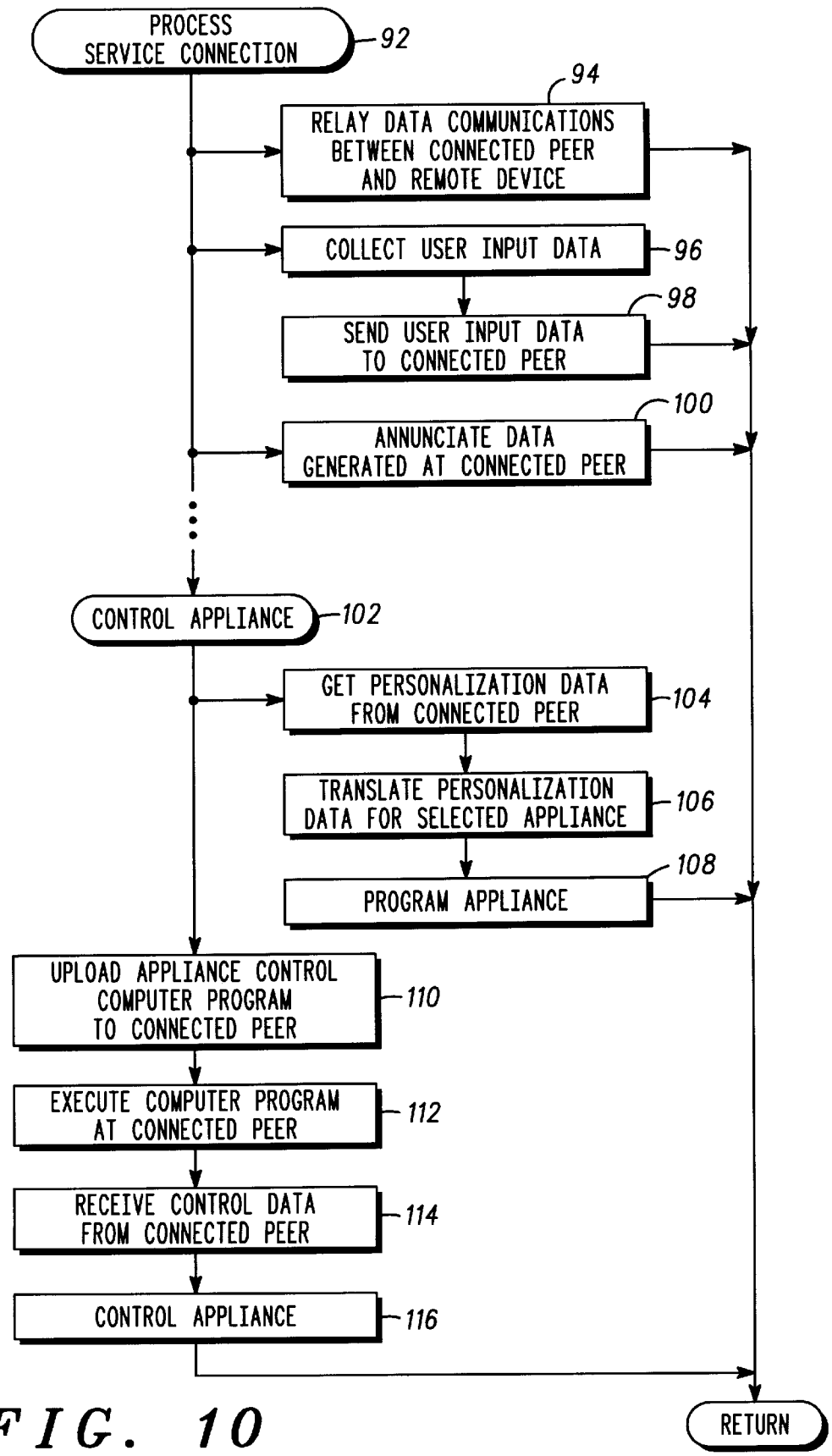
FIG. 10 shows an exemplary flow chart of a process service connection procedure performed at a peer.

FIG. 10 shows a flow chart of process service connection procedure 92. Procedure 92 illustrates a collection of tasks which can be performed at a service-providing peer 20 in support of a service connection. Not all peers 20 need to be able to perform all the tasks depicted in FIG. 10. Likewise, many peers 20 may include other tasks which suit the nature of those particular peers 20.

Procedure 92 performs a task 94 to provide a network relay, router, or gateway capability for a service-receiving peer 20 of network 22 through an established service connection. During task 94, a service-providing peer 20 relays data communications between the connected peer 20 and a remote device 34 (see FIG. 1). After task 94, program flow returns to process 56 (see FIG. 6). Task 94 may be used to extend the service connection to the Internet or other network.

Procedure 92 performs tasks 96 and 98 to provide a user input capability for a service-receiving peer 20 of network 22 through an established service connection. During task 96, the service-providing peer 20 collects user input from its I/O section 46 (see FIG. 2). During task 98, the service-providing peer 20 sends the collected user input data to the connected service-receiving peer 20. After task 98, program flow returns. Tasks 96 and 98 may be used to control or program appliances from a PDA or other device which may have enhanced user input capabilities.

Procedure 92 performs a task 100 to provide a user output capability for a service-receiving peer 20 of network 22 through an established service connection. During task 100, the service-providing peer 20 receives data generated from the service-receiving peer 20 over the service connection and annunciates the data at an output device in its I/O section 46 (see FIG. 2). The data may be annunciated in an audibly or visibly perceivable format or in any other format perceivable by human senses. After task 100, program flow returns. Task 100 may be used to annunciate data collected in a portable peer 20 at a non-portable annunciating device. Alternatively, task 100 may be used to annunciate data generated by a stationary appliance with limited I/O capability at a portable annunciating device.

Procedure 92 performs a control appliance process 102 to support the controlling of appliances. Tasks 104, 106, and 108 of process 102 are performed to program an appliance peer 20 with personalization data 52 (see FIG. 2). During task 104, a service-providing peer 20 gets personalization data 52 from the connected, service-receiving peer 20 using the service connection. Next, task 106 translates the network compatible personalization data 52 into a format suitable for the specific appliance to be programmed with personalization data 52. Those skilled in the art will appreciate that not all personalization data 52 available in a service-receiving peer 20 need to be applicable to all appliances. Thus, task 106 can use as much of personalization data 52 as applies to the specific appliance. After task 106, task 108 causes the appliance to be programmed with the translated personalization data 52. After task 108, program flow returns.

Tasks 110, 112, 114, and 116 of process 102 are performed to allow a user to easily control an appliance. These tasks can be performed on a PDA, for example, which has a display and user input capability exceeding the user I/O capabilities typically found on appliances. In this case, an appliance is a service-receiving peer 20 while the PDA is a service-providing peer 20. During task 110, the service-receiving peer 20 uploads an appliance control computer program to the connected service-providing peer using the service connection. Next, during task 112 the service-providing peer 20 executes the just-uploaded computer program. Task 112 causes the service-providing peer 20 to become specifically configured to provide a desirable user interface for the specific appliance being controlled. Next, during task 114 control data are received at the service-receiving peer 20 over the service connection. The control data originated from user input is supplied through the control computer program being executed on the service-providing peer 20. After task 114, task 116 controls the subject appliance in accordance with the control data received in task 114. After task 116, program flow returns.

In summary, the present invention provides an improved capability addressable network and corresponding method. This network is suitable for interconnecting a plurality of everyday electronic devices, including movable and portable devices that provide a vast and diverse assortment of services. A priori activation and setup procedures are not required in this network because no network specific equipment requires network addresses in order to make connections. Although device addresses are not needed to establish connections, device names must be known by connected peers before meaningful communication can be established and information exchanged. In this context, a device or peer name is simply a unique identifier that allows one device or peer 20 to be uniquely distinguished from any other device or peer 20. Consequently, a minimal amount of user involvement is needed to make connections to peers, and peers may make connections to new peers as a routine matter. Network node addressing is dynamically configurable because network connections are formed based upon proximity and upon a needs and capabilities evaluation rather than on unique network-wide address encoding.

Although the preferred embodiments of the invention have been illustrated and described in detail, it will be readily apparent to those skilled in the art that various modifications may be made therein without departing from the spirit of the invention or from the scope of the appended claims.

What is claimed is:

1. In a capability addressable peer-to-peer data communication network, a method of establishing network connectivity comprising the steps of:

initiating a setup connection between first and second peers of said network by transmitting an unsolicited message containing an identification of said first peer to said second peer;

authorizing said second peer to establish said setup connection with said first peer based on said identification of said first peer:

exchanging needs and capabilities between said first and second peers after establishing said setup connection; and selectively processing an addressed service connection in response to said exchange of needs and capabilities.

2. The method as claimed in claim 1, wherein said addressed service connection occurs when said needs of said first peer match said capabilities of said second peer.

3. The method as claimed in claim 1, wherein said addressed service connection occurs when said needs of said second peer match said capabilities of said first peer.

4. The method as claimed in claim 1, further comprising the steps of:

providing a network capability available through said second peer to said first peer using said service connection; and said network capability includes relaying, at said second peer, data communications between said first peer and a device in data communication with said second peer.

5. The method as claimed in claim 1, further comprising the steps of:

providing a network capability available through said second peer to said first peer using said service connection; and said network capability includes collecting user input data at said second peer and communicating said user input data to said a first peer.

6. The method as claimed in claim 1, further comprising the step of providing a network capability available through said second peer to said first peer using said service connection, wherein said network capability includes annunciating, at said second peer, user output data generated at said first peer.

7. The method as claimed in claim 1, further comprising the step of providing a network capability available through said second peer to said first peer using said service connection, wherein said network capability includes controlling an appliance through said second peer in response to control data generated at said first peer.

8. The method as claimed in claim 7, further comprising the steps of:

uploading a computer program from said second peer to said first peer, said computer program defining a process for controlling said appliance; and executing said computer program at said first peer to generate said control data.

9. The method as claimed in claim 7, further comprising the steps of:

storing personalizing data at said first peer; and programming said appliance with said personalizing data.

10. A method of operating a capability addressable peer-to-peer data communication network comprising the steps of:

a) broadcasting an unsolicited beacon message from a first peer node;

b) identifying said second peer node as being authorized to establish communications with said first peer node when said first peer node receives a response message from said second peer node;

c) establishing a setup connection between said first peer node and said second peer node;

d) receiving information by first peer node describing a network capability provided by said second peer node; and e) forming a service connection between said first peer node and said second peer node when said capability information indicates a capability compatible with a need of said first peer node.

11. A method as claimed in claim 10, further including the step of routing the service connection by the second peer node to a third peer node to fulfill said need of said first peer node, if said second peer node is unable to fulfill said need of said first peer node.

12. A method of operating a capability addressable peer-to-peer data communication network comprising the steps of:

a) detecting, at a first one of a service-requesting peer and a service-providing peer, physical proximity of a second one of said service-requesting and service-providing peers;

b) determining whether a need for a service connection exists at one of said service-requesting and service-providing peers;

c) establishing, if said determining step identifies said need, a setup wireless connection between said service-requesting and service-providing peers;

d) communicating authorization information describing said service-requesting peer to said service-providing peer;

e) forming a wireless service connection between said service-requesting and service-providing peers when said service-requesting peer is authorized through an identification code;

f) communicating capability information describing said service-providing peer to said service-requesting peer;

g) forming said wireless service connection between said service-requesting and service-providing peers when said service-providing peer is determined to have a capability compatible with said need determined in step b); and h) providing said capability using said service connection.

13. A method as claimed in claim 12, wherein said providing step comprises the step of relaying, at said service-providing peer, data communications between said service-requesting peer and a device in data communication with said service-providing peer.

14. A method as claimed in claim 12, wherein said providing step comprises the steps of:

collecting user input data at a first one of said service-providing and service-requesting peers; and communicating said user input data to said a second one of said service-providing and service-requesting peers.

15. A method as claimed in claim 12, wherein said providing step comprises the steps of:

generating user output data at a first one of said service-providing and service-requesting peers; and annunciating said user output data to said a second one of said service-providing and service-requesting peers.

16. A method as claimed in claim 12, wherein said providing step comprises the steps of:

generating appliance control data at a first one of said service-providing and service-requesting peers; and controlling an appliance in accordance with said control data at a second one of said service-providing and service-requesting peers.

17. An apparatus for interactively coupling one appliance to another appliance, comprising:

a receiver for receiving input data;

a transmitter for transmitting output data; and a processor coupled to said transmitter for broadcasting an unsolicited message from said one appliance that includes an identity of said one appliance, and wherein said processor receives through said receiver a response message.

18. The apparatus as claimed in claim 17, wherein a setup connection between said one appliance and said another appliance is formed over a wireless communication link.

19. The apparatus as claimed in claim 18, wherein said setup connection occurs when said one appliance and said another appliance are within a wireless communication range of less of than 400 meters.

20. The apparatus as claimed in claim 17, wherein said processor further includes a memory for storing a list of needs and capabilities of said one appliance that is compared with another list received through said receiver from said another appliance.

* * * * *

(12) EX PARTE REEXAMINATION CERTIFICATE (10857th)

United States Patent
Borgstahl et al.

(10) Number: US 6,069,896 C1
(45) Certificate Issued: Apr. 27, 2016

(54) CAPABILITY ADDRESSABLE NETWORK AND METHOD THEREFOR

(75) Inventors: Ronald W. Borgstahl, Phoenix, AZ (US); Jeffrey Martin Harris, Chandler, AZ (US); Ernest Earl Woodward, Chandler, AZ (US); David G. Leeper, Scottsdale, AZ (US)

(73) Assignee: MOTOROLA MOBILITY LLC, Libertyville, IL (US)

Reexamination Request:
No. 90/012,905, Jul. 2, 2013

Reexamination Certificate for:
Patent No.: 6,069,896
Issued: May 30, 2000
Appl. No.: 08/729,207
Filed: Oct. 15, 1996

(51) Int. Cl.
*H04L 12/46* (2006.01)
*H04L 12/28* (2006.01)
*H04L 29/08* (2006.01)
*H04L 29/06* (2006.01)
*H04W 76/02* (2009.01)
*H04W 84/10* (2009.01)
*H04W 92/18* (2009.01)
*H04W 4/00* (2009.01)

(52) U.S. Cl.
CPC ............ *H04L 12/2803* (2013.01); *H04L 29/06* (2013.01); *H04L 67/16* (2013.01); *H04W 76/02* (2013.01); *H04L 12/2807* (2013.01); *H04L 69/24* (2013.01); *H04L 69/329* (2013.01); *H04L 2012/2841* (2013.01); *H04W 4/00* (2013.01); *H04W 84/10* (2013.01); *H04W 92/18* (2013.01)

(58) Field of Classification Search
None
See application file for complete search history.

(56) References Cited

To view the complete listing of prior art documents cited during the proceeding for Reexamination Control Number 90/012,905, please refer to the USPTO's public Patent Application Information Retrieval (PAIR) system under the Display References tab.

*Primary Examiner* — Joshua Campbell

(57) ABSTRACT

A wireless, peer-to-peer, capability addressable network (22) is disclosed. The network (22) accommodates any number of peers (20). Network connections are formed based upon proximity between peers (20) and upon a needs and capabilities evaluation (82). Networks (22) support three classifications of service capabilities: service requesting, service providing, and service relaying. Wireless communications occur at a sufficiently low power to form a detection zone (28) of less than five meters for many peers (20).

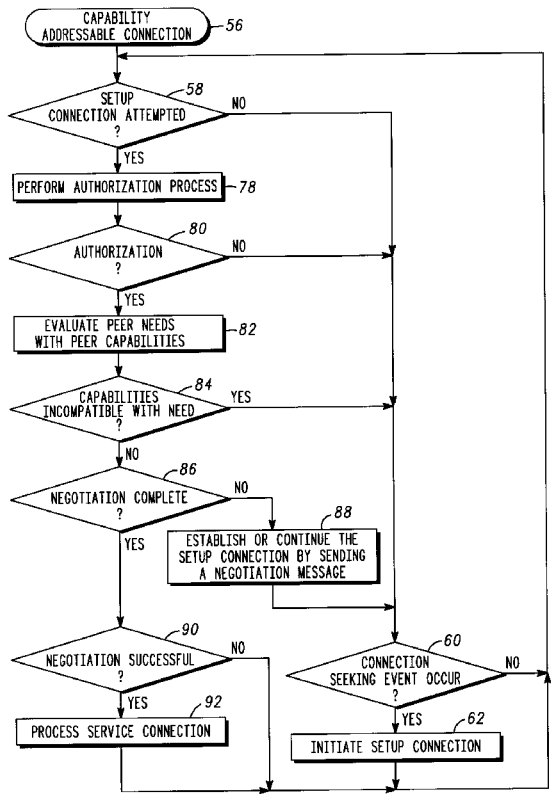

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-3 and 12 is confirmed.

Claim 20 is cancelled.

Claim 17 is determined to be patentable as amended.

Claims 18 and 19, dependent on an amended claim, are determined to be patentable.

New claims 21-33 are added and determined to be patentable.

Claims 4-11 and 13-16 were not reexamined.

17. An apparatus for interactively coupling one appliance to another appliance, comprising:
   a receiver for receiving input data;
   a transmitter for transmitting output data; and
   a processor coupled to said transmitter for broadcasting an unsolicited message from said one appliance that includes an identity of said one appliance, and wherein said processor receives through said receiver a response message, *wherein said processor further includes a memory for storing a list of needs and capabilities of said one appliance that is compared with another list received through said receiver from said another appliance.*

21. *In a capability addressable peer-to-peer data communication network, a method of establishing network connectivity comprising the steps of:*
   *initiating a setup connection between first and second peers of said network by transmitting an unsolicited message containing an identification of said first peer to said second peer;*
   *authorizing said second peer to establish said setup connection with said first peer based on said identification of said first peer in response to determining, in an authorization process that restricts access to said second peer, that at least one data code related to said identification of said first peer confirms that said first peer is permitted access to said second peer;*
   *exchanging needs and capabilities between said first and second peers after establishing said setup connection; and*
   *selectively processing an addressed service connection in response to said exchange of needs and capabilities.*

22. *The method as claimed in claim 21, wherein said at least one data code comprises a plurality of data codes of an authorization key.*

23. *In a capability addressable peer-to-peer data communication network, a method of establishing network connectivity comprising the steps of:*
   *storing authorization data corresponding to one or more peers including a first peer, the authorization data being accessible to a second peer;*
   *after storing the authorization data, initiating a setup connection between the first peer and the second peer of said network by transmitting an unsolicited message containing an identification of said first peer to said second peer;*
   *authorizing said second peer to establish said setup connection with said first peer based on said identification of said first peer using at least one data code related to said identification of said first peer;*
   *exchanging needs and capabilities between said first and second peers after establishing said setup connection; and*
   *selectively processing an addressed service connection in response to said exchange of needs and capabilities.*

24. *In a capability addressable peer-to-peer data communication network, a method of establishing network connectivity comprising the steps of:*
   *storing authorization data corresponding to one or more peers including a first peer, the authorization data being accessible to a second peer;*
   *after storing the authorization data, initiating a setup connection between the first peer and the second peer of said network by transmitting an unsolicited message containing an identification of said first peer to said second peer;*
   *authorizing said second peer to establish said setup connection with said first peer based on said identification of said first peer in response to determining, in an authorization process that restricts access to said second peer, that at least one data code related to said identification of said first peer corresponds to the stored authorization data;*
   *exchanging needs and capabilities between said first and second peers after establishing said setup connection; and*
   *selectively processing an addressed service connection in response to said exchange of needs and capabilities.*

25. *A method of operating a capability addressable peer-to-peer data communication network comprising the steps of:*
   *a) detecting, at a first one of a service-requesting peer and a service-providing peer, physical proximity of a second one of said service-requesting and service-providing peers;*
   *b) determining whether a need for a service connection exists at one of said service-requesting and service-providing peers;*
   *c) establishing, if said determining step identifies said need, a setup wireless connection between said service-requesting and service-providing peers;*
   *d) communicating authorization information describing said service-requesting peer to said service-providing peer;*
   *e) forming a wireless service connection between said service-requesting and service-providing peers when said service-requesting peer is authorized through an identification code, wherein said service-requesting peer is authorized in response to determining, in an authorization process that restricts access to said service-requesting peer, that at least one data code related to said identification code confirms that said service-requesting peer is permitted access to said service-providing peer;*
   *f) communicating capability information describing said service-providing peer to said service-requesting peer;*
   *g) forming said wireless service connection between said service-requesting and service-providing peers when said service-providing peer is determined to have a capability compatible with said need determined in step b); and*
   *h) providing said capability using said service connection.*

26. The method as claimed in claim 25, wherein said at least one data code comprises a plurality of data codes of an authorization key.

27. A method of operating a capability addressable peer-to-peer data communication network comprising the steps of:
  a) storing authorization data corresponding to one or more service-requesting peers including a first service-requesting peer, the authorization data being accessible to a service-providing peer;
  b) after storing the authorization data, detecting, at a first one of the first service-requesting peer and the service-providing peer, physical proximity of a second one of the first service-requesting peer and the service-providing peer;
  c) determining whether a need for a service connection exists at one of said first service-requesting peer and the service-providing peer;
  d) establishing, if said determining step identifies said need, a setup wireless connection between said first service-requesting peer and the service-providing peer;
  e) communicating authorization information describing said first service-requesting peer to said service-providing peer;
  f) forming a wireless service connection between said first service-requesting peer and the service-providing peer when said first service-requesting peer is authorized through an identification code using at least one data code related to said identification code of the first service-requesting peer;
  g) communicating capability information describing said service-providing peer to said first service-requesting peer;
  h) forming said wireless service connection between said first service-requesting peer and said service-providing peer when said service-providing peer is determined to have a capability compatible with said need determined in step c); and
  i) providing said capability using said service connection.

28. A method of operating a capability addressable peer-to-peer data communication network comprising the steps of:
  a) storing authorization data corresponding to one or more service-requesting peers including a first service-requesting peer, the authorization data being accessible to a service-providing peer;
  b) after storing the authorization data, detecting, at a first one of the first service-requesting peer and the service-providing peer, physical proximity of a second one of the first service-requesting peer and the service-providing peer;
  c) determining whether a need for a service connection exists at one of said first service-requesting peer and the service-providing peer;
  d) establishing, if said determining step identifies said need, a setup wireless connection between said first service-requesting peer and the service-providing peer;
  e) communicating authorization information describing said first service-requesting peer to said service-providing peer;
  f) forming a wireless service connection between said first service-requesting peer and the service-providing peer when said first service-requesting peer is authorized through an identification code, wherein said first service-requesting peer is authorized in response to determining, in an authorization process that restricts access to said service-providing peer, that at least one data code related to said identification code corresponds to the stored authorization data;
  g) communicating capability information describing said service-providing peer to said first service-requesting peer;
  h) forming said wireless service connection between said first service-requesting peer and the service-providing peer when said service-providing peer is determined to have a capability compatible with said need determined in step c); and
  i) providing said capability using said service connection.

29. An apparatus for interactively coupling one appliance to another appliance, comprising:
  a receiver circuit for receiving input data;
  a transmitter circuit for transmitting output data; and
  a processor circuit coupled to said transmitter circuit for:
    broadcasting an unsolicited message from said one appliance that includes an identity of said one appliance, wherein said another appliance is authorized to establish a setup connection in response to determining, in an authorization process that restricts access to said one appliance, that at least one data code related to said identity of said one appliance confirms that said one appliance is permitted access to said another appliance;
    exchanging needs and capabilities with said another appliance through said transmitter circuit and said receiver circuit; and
    processing a service connection in response to said exchange of needs and capabilities, wherein said processor circuit receives through said receiver circuit a response message.

30. An apparatus for interactively coupling one appliance to another appliance, comprising:
  a receiver circuit for receiving input data;
  a transmitter circuit for transmitting output data; and
  a processor circuit coupled to said transmitter circuit for:
    broadcasting an unsolicited message from said one appliance that includes an identity of said one appliance, and wherein said processor circuit receives through said receiver circuit a response message in response to determining, in an authorization process that restricts access to said one appliance, that at least one data code related to said identity of said one appliance confirms that said one appliance is permitted access to said another appliance;
    exchanging needs and capabilities with said another appliance through said transmitter circuit and said receiver circuit; and
    processing a service connection in response to said exchange of needs and capabilities.

31. An apparatus for interactively coupling one appliance to another appliance, comprising:
  a receiver circuit for receiving input data;
  a storage circuit for storing authorization data of one or more appliances including said one appliance, the authorization data being accessible to said another appliance;
  a transmitter circuit for transmitting output data; and
  a processor circuit coupled to said transmitter circuit for:
    after the authorization data is stored, broadcasting an unsolicited message from said one appliance that includes an identity of said one appliance, and wherein said processor circuit receives through said receiver circuit a response message in response to determining that said one appliance is authorized using at least one data code related to said identity of said one appliance;

exchanging needs and capabilities with said another appliance through said transmitter circuit and said receiver circuit; and processing a service connection in response to said exchange of needs and capabilities.

32. *An apparatus for interactively coupling one appliance to another appliance, comprising:*

*a receiver circuit for receiving input data;*

*a storage circuit for storing authorization data of one or more appliances including said one appliance, the authorization data being accessible to said another appliance;*

*a transmitter circuit for transmitting output data; and*

*a processor circuit coupled to said transmitter circuit for:*

*after the authorization data is stored, broadcasting an unsolicited message from said one appliance that includes an identity of said one appliance, and wherein said processor circuit receives through said receiver circuit a response message in response to determining, in an authorization process that restricts access to said another appliance, that at least one data code related to said identity of said one appliance corresponds to the stored authorization data;*

*exchanging needs and capabilities with said another appliance through said transmitter circuit and said receiver circuit; and*

*processing a service connection in response to said exchange of needs and capabilities.*

33. *A method as claimed in claim 12 further comprising exchanging needs and capabilities between said service-requesting and service-providing peers before forming said wireless service connection.*

\* \* \* \* \*

(12) EX PARTE REEXAMINATION CERTIFICATE (10892nd)
United States Patent
Borgstahl et al.

(10) Number: US 6,069,896 C2
(45) Certificate Issued: Jun. 22, 2016

(54) CAPABILITY ADDRESSABLE NETWORK AND METHOD THEREFOR

(75) Inventors: Ronald W. Borgstahl, Phoenix, AZ (US); Jeffrey Martin Harris, Chandler, AZ (US); Ernest Earl Woodward, Chandler, AZ (US); David G. Leeper, Scottsdale, AZ (US)

(73) Assignee: MOTOROLA MOBILITY LLC, Libertyville, IL (US)

Reexamination Request:
No. 90/013,275, Jul. 23, 2014

Reexamination Certificate for:
Patent No.: 6,069,896
Issued: May 30, 2000
Appl. No.: 08/729,207
Filed: Oct. 15, 1996

Reexamination Certificate C1 6,069,896 issued Apr. 27, 2016

(51) Int. Cl.
| | |
|---|---|
| *H04L 12/46* | (2006.01) |
| *H04L 12/28* | (2006.01) |
| *H04L 29/08* | (2006.01) |
| *H04L 29/06* | (2006.01) |
| *H04W 76/02* | (2009.01) |
| *H04W 84/10* | (2009.01) |
| *H04W 92/18* | (2009.01) |
| *H04W 4/00* | (2009.01) |

(52) U.S. Cl.
CPC ............ *H04L 12/2803* (2013.01); *H04L 29/06* (2013.01); *H04L 67/16* (2013.01); *H04W 76/02* (2013.01); *H04L 12/2807* (2013.01); *H04L 69/24* (2013.01); *H04L 69/329* (2013.01); *H04L 2012/2841* (2013.01); *H04W 4/00* (2013.01); *H04W 84/10* (2013.01); *H04W 92/18* (2013.01)

(58) Field of Classification Search
None
See application file for complete search history.

(56) References Cited

To view the complete listing of prior art documents cited during the proceeding for Reexamination Control Number 90/013,275, please refer to the USPTO's public Patent Application Information Retrieval (PAIR) system under the Display References tab.

*Primary Examiner* — Fred Ferris, III

(57) ABSTRACT

A wireless, peer-to-peer, capability addressable network (22) is disclosed. The network (22) accommodates any number of peers (20). Network connections are formed based upon proximity between peers (20) and upon a needs and capabilities evaluation (82). Networks (22) support three classifications of service capabilities: service requesting, service providing, and service relaying. Wireless communications occur at a sufficiently low power to form a detection zone (28) of less than five meters for many peers (20).

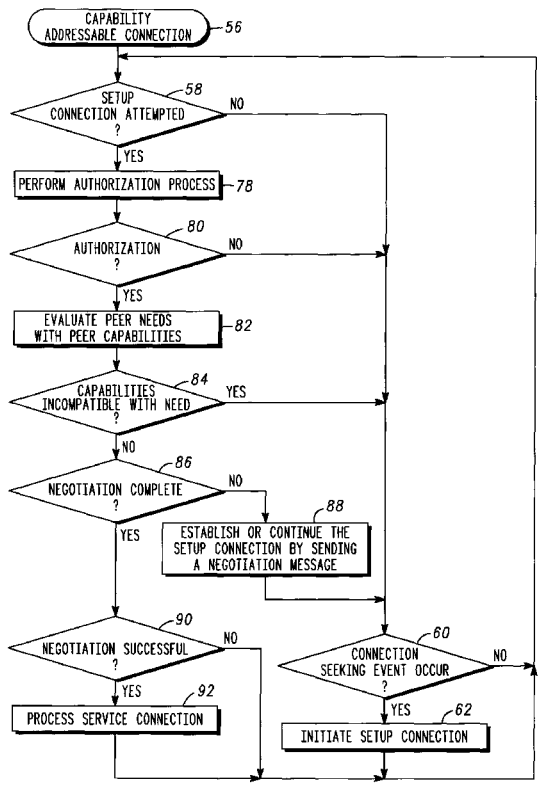

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-3 and 12 is confirmed.

Claim 20 is cancelled.

Claim 17 is determined to be patentable as amended.

New claims 21-33 are added and determined to be patentable.

Claims 4-11, 13-16, 18 and 19 were not reexamined.

17. An apparatus for interactively coupling one appliance to another appliance, comprising:
 a receiver for receiving input data;
 a transmitter for transmitting output data; and
 a processor coupled to said transmitter for broadcasting an unsolicited message from said one appliance that includes an identity of said one appliance, and wherein said processor receives through said receiver a response message, *wherein said processor further includes a memory for storing a list of needs and capabilities of said one appliance that is compared with another list received through said receiver from said another appliance.*

*21. In a capability addressable peer-to-peer data communication network, a method of establishing network connectivity comprising the steps of:*
 *initiating a setup connection between first and second peers of said network by transmitting an unsolicited message containing an identification of said first peer to said second peer;*
 *authorizing said second peer to establish said setup connection with said first peer based on said identification of said first peer in response to determining, in an authorization process that restricts access to said second peer, that at least one data code related to said identification of said first peer confirms that said first peer is permitted access to said second peer;*
 *exchanging needs and capabilities between said first and second peers after establishing said setup connection; and*
 *selectively processing an addressed service connection in response to said exchange of needs and capabilities.*

*22. The method as claimed in claim 21, wherein said at least one data code comprises a plurality of data codes of an authorization key.*

*23. In a capability addressable peer-to-peer data communication network, a method of establishing network connectivity comprising the steps of:*
 *storing authorization data corresponding to one or more peers including a first peer, the authorization data being accessible to a second peer;*
 *after storing the authorization data, initiating a setup connection between the first peer and the second peer of said network by transmitting an unsolicited message containing an identification of said first peer to said second peer;*
 *authorizing said second peer to establish said setup connection with said first peer based on said identification of said first peer using at least one data code related to said identification of said first peer;*
 *exchanging needs and capabilities between said first and second peers after establishing said setup connection; and*
 *selectively processing an addressed service connection in response to said exchange of needs and capabilities.*

*24. In a capability addressable peer-to-peer data communication network, a method of establishing network connectivity comprising the steps of:*
 *storing authorization data corresponding to one or more peers including a first peer, the authorization data being accessible to a second peer;*
 *after storing the authorization data, initiating a setup connection between the first peer and the second peer of said network by transmitting an unsolicited message containing an identification of said first peer to said second peer;*
 *authorizing said second peer to establish said setup connection with said first peer based on said identification of said first peer in response to determining, in an authorization process that restricts access to said second peer, that at least one data code related to said identification of said first peer corresponds to the stored authorization data;*
 *exchanging needs and capabilities between said first and second peers after establishing said setup connection; and*
 *selectively processing an addressed service connection in response to said exchange of needs and capabilities.*

*25. A method of operating a capability addressable peer-to-peer data communication network comprising the steps of:*
 *a) detecting, at a first one of a service-requesting peer and a service-providing peer, physical proximity of a second one of said service-requesting and service-providing peers;*
 *b) determining whether a need for a service connection exists at one of said service-requesting and service-providing peers;*
 *c) establishing, if said determining step identifies said need, a setup wireless connection between said service-requesting and service-providing peers;*
 *d) communicating authorization information describing said service-requesting peer to said service-providing peer;*
 *e) forming a wireless service connection between said service-requesting and service-providing peers when said service-requesting peer is authorized through an identification code, wherein said service-requesting peer is authorized in response to determining, in an authorization process that restricts access to said service-requesting peer, that at least one data code related to said identification code confirms that said service-requesting peer is permitted access to said service-providing peer;*
 *f) communicating capability information describing said service-providing peer to said service-requesting peer;*
 *g) forming said wireless service connection between said service-requesting and service-providing peers when said service-providing peer is determined to have a capability compatible with said need determined in step b); and*
 *h) providing said capability using said service connection.*

26. The method as claimed in claim 25, wherein said at least one data code comprises a plurality of data codes of an authorization key.

27. A method of operating a capability addressable peer-to-peer data communication network comprising the steps of:
   a) storing authorization data corresponding to one or more service-requesting peers including a first service-requesting peer, the authorization data being accessible to a service-providing peer;
   b) after storing the authorization data, detecting, at a first one of the first service-requesting peer and the service-providing peer, physical proximity of a second one of the first service-requesting peer and the service-providing peer;
   c) determining whether a need for a service connection exists at one of said first service-requesting peer and the service-providing peer;
   d) establishing, if said determining step identifies said need, a setup wireless connection between said first service-requesting peer and the service-providing peer;
   e) communicating authorization information describing said first service-requesting peer to said service-providing peer;
   f) forming a wireless service connection between said first service-requesting peer and the service-providing peer when said first service-requesting peer is authorized through an identification code using at least one data code related to said identification code of the first service-requesting peer;
   g) communicating capability information describing said service-providing peer to said first service-requesting peer;
   h) forming said wireless service connection between said first service-requesting peer and said service-providing peer when said service-providing peer is determined to have a capability compatible with said need determined in step c); and
   i) providing said capability using said service connection.

28. A method of operating a capability addressable peer-to-peer data communication network comprising the steps of:
   a) storing authorization data corresponding to one or more service-requesting peers including a first service-requesting peer, the authorization data being accessible to a service-providing peer;
   b) after storing the authorization data, detecting, at a first one of the first service-requesting peer and the service-providing peer, physical proximity of a second one of the first service-requesting peer and the service-providing peer;
   c) determining whether a need for a service connection exists at one of said first service-requesting peer and the service-providing peer;
   d) establishing, if said determining step identifies said need, a setup wireless connection between said first service-requesting peer and the service-providing peer;
   e) communicating authorization information describing said first service-requesting peer to said service-providing peer;
   f) forming a wireless service connection between said first service-requesting peer and the service-providing peer when said first service-requesting peer is authorized through an identification code, wherein said first service-requesting peer is authorized in response to determining, in an authorization process that restricts access to said service-providing peer, that at least one data code related to said identification code corresponds to the stored authorization data;
   g) communicating capability information describing said service-providing peer to said first service-requesting peer;
   h) forming said wireless service connection between said first service-requesting peer and the service-providing peer when said service-providing peer is determined to have a capability compatible with said need determined in step c); and
   i) providing said capability using said service connection.

29. An apparatus for interactively coupling one appliance to another appliance, comprising:
   a receiver circuit for receiving input data;
   a transmitter circuit for transmitting output data; and
   a processor circuit coupled to said transmitter circuit for:
      broadcasting an unsolicited message from said one appliance that includes an identity of said one appliance, wherein said another appliance is authorized to establish a setup connection in response to determining, in an authorization process that restricts access to said one appliance, that at least one data code related to said identity of said one appliance confirms that said one appliance is permitted access to said another appliance;
      exchanging needs and capabilities with said another appliance through said transmitter circuit and said receiver circuit; and
      processing a service connection in response to said exchange of needs and capabilities, wherein said processor circuit receives through said receiver circuit a response message.

30. An apparatus for interactively coupling one appliance to another appliance, comprising:
   a receiver circuit for receiving input data;
   transmitter circuit for transmitting output data; and
   a processor circuit coupled to said transmitter circuit for:
      broadcasting an unsolicited message from said one appliance that includes an identity of said one appliance, and wherein said processor circuit receives through said receiver circuit a response message in response to determining, in an authorization process that restricts access to said one appliance, that at least one data code related to said identity of said one appliance confirms that said one appliance is permitted access to said another appliance;
      exchanging needs and capabilities with said another appliance through said transmitter circuit and said receiver circuit; and
      processing a service connection in response to said exchange of needs and capabilities.

31. An apparatus for interactively coupling one appliance to another appliance, comprising:
   a receiver circuit for receiving input data;
   a storage circuit for storing authorization data of one or more appliances including said one appliance, the authorization data being accessible to said another appliance;
   a transmitter circuit for transmitting output data; and
   a processor circuit coupled to said transmitter circuit for:
      after the authorization data is stored, broadcasting an unsolicited message from said one appliance that includes an identity of said one appliance, and wherein said processor circuit receives through said receiver circuit a response message in response to determining that said one appliance is authorized using at least one data code related to said identity of said one appliance;

exchanging needs and capabilities with said another appliance through said transmitter circuit and said receiver circuit; and processing a service connection in response to said exchange of needs and capabilities.

32. *An apparatus for interactively coupling one appliance to another appliance, comprising:*

*a receiver circuit for receiving input data;*

*a storage circuit for storing authorization data of one or more appliances including said one appliance, the authorization data being accessible to said another appliance;*

*a transmitter circuit for transmitting output data; and*

*a processor circuit coupled to said transmitter circuit for:*

*after the authorization data is stored, broadcasting an unsolicited message from said one appliance that includes an identity of said one appliance, and wherein said processor circuit receives through said receiver circuit a response message in response to determining, in an authorization process that restricts access to said another appliance, that at least one data code related to said identity of said one appliance corresponds to the stored authorization data;*

*exchanging needs and capabilities with said another appliance through said transmitter circuit and said receiver circuit; and*

*processing a service connection in response to said exchange of needs and capabilities.*

33. *A method as claimed in claim 12 further comprising exchanging needs and capabilities between said service-requesting and service-providing peers before forming said wireless service connection.*

\* \* \* \* \*